Dec. 6, 1966  S. L. EHRLICH ET AL  3,290,646
SONAR TRANSDUCER

Original Filed April 6, 1960  3 Sheets-Sheet 2

INVENTORS
STANLEY L. EHRLICH
PAUL D. FRELICH

BY Carole M. Colman
AGENT

Dec. 6, 1966    S. L. EHRLICH ET AL    3,290,646
SONAR TRANSDUCER

Original Filed April 6, 1960    3 Sheets-Sheet 3

OMNIDIRECTIONAL

N.S.(RELATIVE)

E.W.(RELATIVE)

INVENTORS
STANLEY L. EHRLICH
PAUL D. FRELICH

BY *Carole M. Colman*
AGENT

United States Patent Office 3,290,646
Patented Dec. 6, 1966

3,290,646
SONAR TRANSDUCER
Stanley L. Ehrlich, Middletown, R.I., and Paul D. Frelich, Scituate, Mass., assignors to Raytheon Company, Waltham, Mass., a corporation of Delaware
Original application Apr. 6, 1960, Ser. No. 20,444, now Patent No. 3,176,262, dated Mar. 30, 1965. Divided and this application Nov. 9, 1964, Ser. No. 409,874
6 Claims. (Cl. 340—8)

This invention is concerned with transducers useful in the detection of submerged objects. This is a divisional specification of co-pending United States patent application, Serial No. 20,444, now Patent Number 3,176,262, filed April 6, 1960 by Stanley L. Ehrlich and Paul D. Frelich, and entitled, "Directional Sonar System."

More particularly, this invention provides a unique, lightweight multimode transducer which produces simultaneously two dipole patterns with substantially mutually perpendicular acoustic axes and an omnidirectional pattern from plane-wave signals.

It is well known that helicopters can traverse large distances at comparatively high speed, and are capable of a high search rate to maintain equipment weight at a minimum. Present-day helicopter-borne detection systems are designed as a search-light sonar. Because of the inherent operating characteristics of searchlight-type sonar, the helicopter when searching is required to hover at one joint until a 360 degree scan in azimuth is completed. Previous attempts to reduce this inefficient use of available endurance have been thwarted to varying degrees primarily by difficulties encountered in keeping the weight of high-scan-rate equipment within acceptable limitations. Further, the amount of cable that can be used with present day helicopter-borne sonar sets is limited due to the over-all weight of the equipment, the size of the cable required, and particularly important, the weight of the transducer. For these reasons, the maximum limit to which the transducer may be submerged is severely limited. This is particularly disadvantageous due to the increased operating depths of present-day submarines and the increased maximum depths to which they can descend.

The use of this invention in a detection system in the passive or listening mode for the conversion of plane-wave signals into multiple transducer modes which are received simultaneously permits instantaneous, directional, passive listening with 360 degrees coverage without conventional mechanical or electronic scanning. This effectively infinite scan rate results in a greatly increased search rate in the echo-ranging or active mode.

Accordingly, a primary object of the invention is to provide an improved simultaneous multiple mode transducer, and more particularly, one which is light in weight.

The foregoing and other features, objects and advantages of the invention including certain details more completely described hereinafter relating to the preferred form will become more fully evident from the following description and the accompanying drawings wherein.

Figure 6:
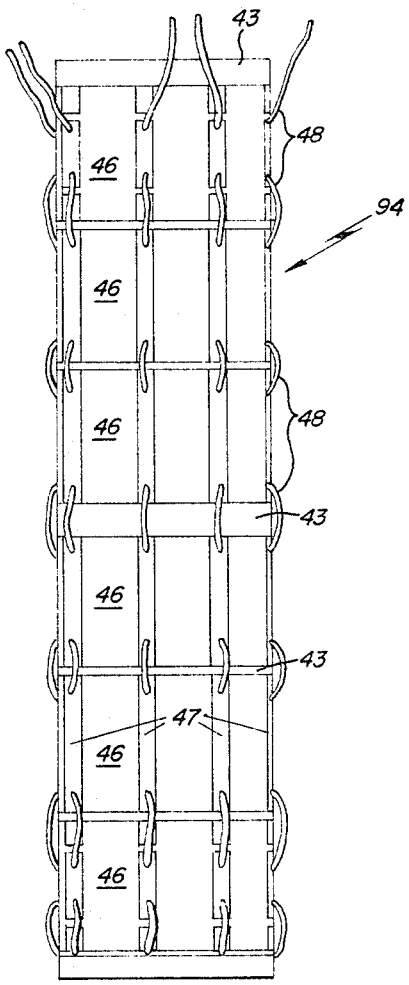
Figure 3:
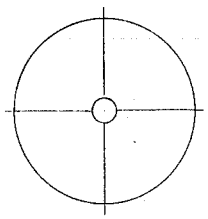
Figure 4:
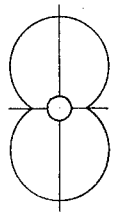
Figure 5:
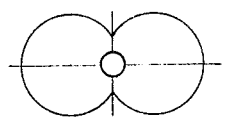
Figure 7:
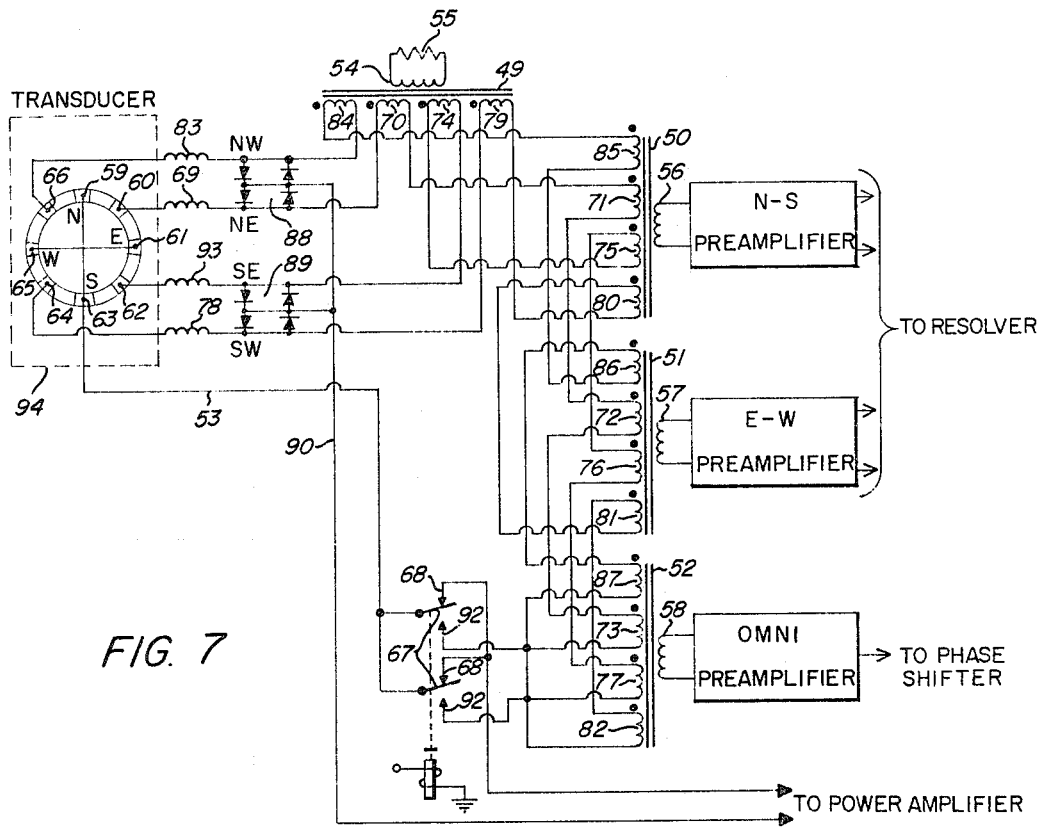

FIGS. 3, 4, and 5 are graphic illustrations showing the patterns provided by the transducer invention and their relation one with another;

FIG. 6 is a side view showing the cylindrical transducer invention located in the sea unit; and, FIG. 7 is a schematic diagram partly in block form of the transducer invention.

Figure 1:
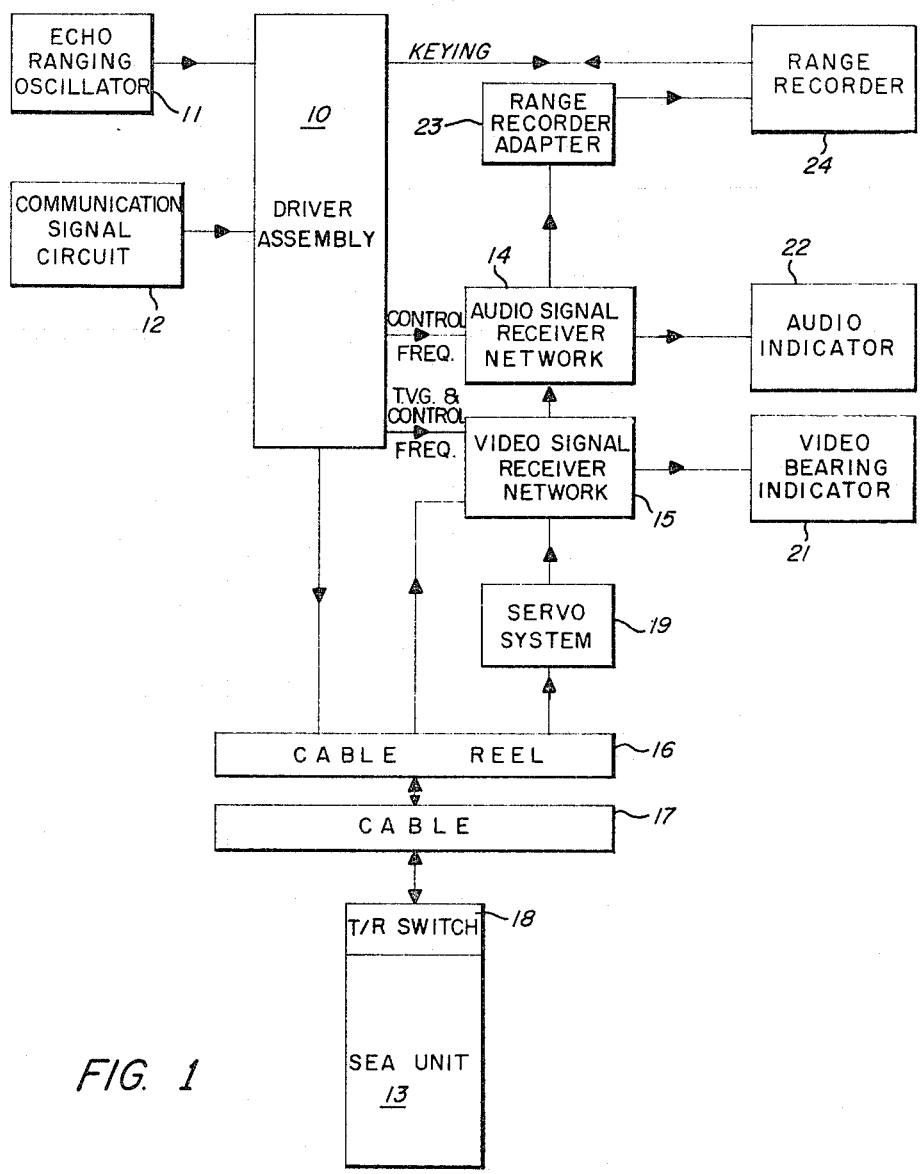
FIG. 1 is a block diagram of a suitable system for using the invention.

A highly simplified block diagram of the system adapted for use with helicopters and described in the above-referenced patent application which is incorporated by reference herein, is shown in FIG. 1 as an aid in understanding the transducer invention. Broadly, as shown in FIGURE 1, the system includes a driver assembly 10, more thoroughly discussed hereinafter, for performing necessary keying operations, receiving and supplying to the transducer 94 in the sea unit 13 a carrier frequency from an echo-ranging oscillator 11 and audio signals from a communication circuit 12 supplying control frequencies to both the audio signal receiver network 14 and the video signal receiver network 15, and a TVG (time varied gain) control signal to the video signal receiver network 15. The carrier signal for echo ranging is supplied from the driver assembly 10 to the transducer 94 in the sea unit 13 through a cable reel 16, cable 17, and a T/R (transmit-receive) switch 18. The T/R switch 18, responsive to a keying signal connects the transducer 94 to the proper conductors in the cable 17 for transmitting and receiving operations. The transducer 94 more thoroughly described hereinafter provides two dipole patterns with acoustic axes at right angles and an omnidirectional pattern. The T/R switch 18 connects the carrier signal from the driver assembly 10 to the omnidirectional pattern during transmission, and during reception connects the signal from the omnidirectional pattern to the video receiver network 15 and the signals from the dipole patterns to a servo system 19 for resolving the dipole signals (in relative form) to true-bearing form which are then in turn supplied to the video signal receiver network 15. The servo system 19 is responsive to a gyro compass located in the sea unit 13 and as mentioned immediately hereinabove the servo system resolves the signals in relative form from the dipole patterns to true-bearing form. The omnidirectional signal is phase shifted 90 degrees and in combination with the dipole signals in true-bearing form comprises the essential input signals to the video signal receiver network 15. The video signal receiver network 15 comprises essentially three filter and gain controlled amplifier channels with reverberation control circuitry. The function of the reverberation control circuitry is to adjust amplification in accordance with reverberation and to insure that the amplifiers for the true-bearing signals track one with another to prevent or minimize bearing errors. The output signals of the video signal receiver network 15, amplified to compensate for reverberation and to prevent errors due to unequal amplification of the dipole signals in true bearing form are supplied to a video-bearing indicator 21 or cathode ray oscilloscope to indicate target bearing. The dipole signals are connected to the vertical and horizontal deflection means of the cathode ray tube and the phase shifted omnidirectional signal is connected to the brightness control of the cathode ray tube to provide bearing sense. A portion of the output signals of the video signal receiver network 15 is supplied to the audio signal receiver network 14 which by means of three summing circuits provides four cardioid pattern output signals. These cardioid pattern output signals are supplied to an audio indicator 22 comprising audio means such as, for example, a set of binaural earphones in such a manner as to produce, as a supplement to the video-bearing indicator means 21, different audio signals in a different earphone corresponding to the general bearing of a target. Means are also provided in the audio signal receiver network whereby the aforementioned cardioid signals may be selectively used to suppress indications of a target in any one of four quadrants. The range recorder adapter 23, which is a mixer, receives signals from the audio signal receiver network 14 and supplies them in suitable form to a range recorder 24 wherein the range of targets is permanently recorded in conventional manner.

Figure 2:
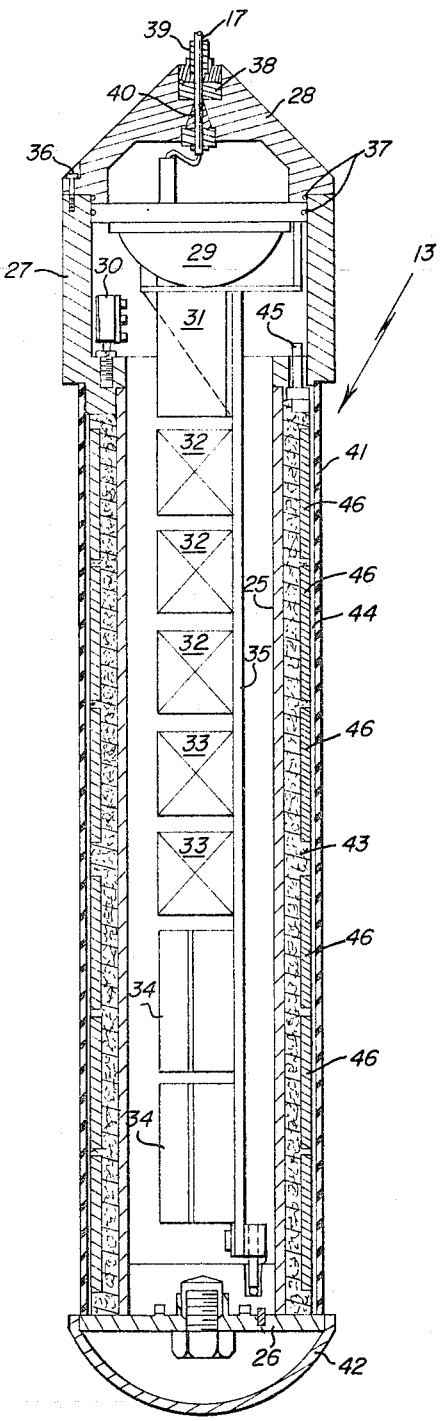
FIG. 2 is a sectional view of the sea unit containing the transducer invention.

With reference now to FIG. 2 which shows the structural features of the sea unit 13 in detail which contains transducer 94, the sea unit 13 hangs in a vertical position at the end of the load-bearing cable 17 for sonar operation. As shown in FIG. 2, the sea unit is comprised of a rigid center tube 25 having a lower-end fitting 26 sealably attached to its lower end, and an upper-end fitting 28 removably and sealably attached to the upper end of the cylindrical portion 27 to form an air-filled and watertight compartment. Contained within this compartment is a gyrocompass 29, a depth detector 30, and certain portions of the circuitry associated with the transducer 94, such as, for example, preamplifiers 31, matching transformers 32, relays 33, and tuning coils 34 hereinafter more completely described in connection with FIG. 7. The aforementioned components are mounted on a removable base or frame 35 which extends substantially the length of the sea unit. The upper cylindrical portion 27 which contains the gyrocompass 29 and a suitable depth detector 30 is fixedly attached to the center tube 25 such as by welding or the like, and the upper end fitting 28 is removably attached to the upper cylindrical portion by bolts 36 or the like. O rings 37 provide, respectively, a primary and secondary water-tight seal at the junction of the end fitting 28 and cylindrical portion 27. Conventional cable sealing means of a type well known in the art, such as, for example, a compressible element 38 and means 39 to compress this element to form a watertight seal in a conventional manner provide a primary watertight seal in combination with a load-bearing seal 40 at the cable 17. The upper end fitting 28 is made removable to facilitate assembly and maintenance of the transducer 94 and the upper cylindrical portion 27 provides protection for the transducer 94 during lowering and raising operations and supports the transducer boot or acoustic window 41 which covers the transducer active elements. A streamlined cap 42 containing space for weighting the sea unit, if necessary, to obtain a desired sinking rate is provided at the bottom of the sea unit to facilitate water entry.

The active elements of the transducer 94 consists of separate cylindrical barium titanate ($BaTiO_3$) elements acoustically isolated from the support member on center tube 25 and from each other by a suitable pressure release material 43 such as Corprene. The outer surface of the active elements are covered and protected by a boot or acoustic window 41, which is provided with a watertight seal at its ends and is spaced away a short distance from the transducer active elements. The boot 41 is maintained in spaced relationship with the transducer active elements by filling the space 44 therebetween with a suitable oil, such as DC-500 silicon oil. A valve 45 permits oil to be introduced into the space 44 between the active elements and the boot and the electrical leads from the active elements are brought through suitable pressure-tight connectors (not shown) to the air-filled compartment. It has been found that an operative sea unit may be constructed to have a maximum diameter of six and three-quarter inches, a maximum length of forty-six inches, and a maximum weight of sixty-three pounds. The active elements 46 used in the aforementioned sea unit were six circumferentially polarized cylindrical barium titanate elements axially mounted on the center tube 25. Each of the active elements 46 were three inches high with a five inch outside diameter and a one-quarter inch wall. The boot 41, consisting of wrapped neoprene, had a wall thickness of 1/8 inch and an outside diameter of six and three-quarter inches and the center tube 25 had a diameter of about four inches.

When connected in the manner as described hereinafter, the transducer provides three patterns as shown in FIGS. 3, 4, and 5. These patterns are, respectively, an omnidirectional patterns as shown in FIG. 3, a NS (relative) dipole pattern as shown in FIG. 4, and an EW (relative) dipole pattern as shown in FIG. 5, the acoustic axes of the EW pattern being substantially at right angles to those of the NS pattern.

The transducer active elements 46 are more clearly shown in FIG. 6 where they comprise a cylindrical barium titanate line transducer 94 consisting of six cylindrical active elements 46 axially mounted on the center tube 25 and acoustically isolated therefrom and from each other by suitable pressure release material 43. Each active element is provided with a plurality of electrodes 47 on their outer surfaces formed, for example, by depositing thereon a conductive material in strip form at equally spaced intervals. For the embodiment shown an described, eight electrodes are provided although it is to be understood that the patterns may be formed with a greater or even a lesser number of electrodes. The two end active elements have about half of each electrode formed thereon removed to provide shading for rejection of noise along the longitudinal axis of the transducer 94 such as, for example, helicopter noise. The electrodes 47 of the active elements 46 are aligned one with another upon assembly on the center tube 25 and the longitudinally adjacent electrodes on each element are electrically connected by conductors 48 to form eight continuous parallel and axial electrodes certain ones of which are connected to four windings of a transformer shown in detail in FIG. 7. It has been found that dipole patterns with a sufficient null depth of about 20 db are obtained if all four quadrants of the transducer 94 are used to form the beam. It is more difficult to achieve a specified null depth if only two opposite quadrants are used to form the beam. For this reason, a four quadrant scheme for connection of the transducer is used to obtain maximum null depth and uniform polarization of the active elements is necessary for orthogonal null angle separation. Further, in order to insure accurate true bearing indications of targets, the gyrocompass must be of the type capable of alignment and must be aligned with the transducer 94. Upon acoustical alignment of the transducer 94 with an indexing mark on an exposed surface of the sea unit or, alternately, the determination of the location of the indexing mark on the basis of the acoustic characteristics of the transducer 94, the alignment thereafter of the gyrocompass with this mark insures that the subsequent conversion of the electrical signals in relative form from the transducer 94 to true-bearing form will consistently provide accurate (magnetic) true-bearing information of targets irrespective of the instantaneous position of the transducer 94.

Bearing angle determination is provided by the transducer 94, the combining network associated therewith, and a 90 degree phase shifter hereinafter described. Transducer 94 includes eight axial electrodes 59, 60, 61, 62, 63, 64, 65 and 66 of which electrodes 60, 62, 64, and 66 are quadrature electrodes. As will become more apparent hereinafter, four basic signals are available from the transducer 94. These four basic signals, which are in relative form, are indicated in FIG. 7 as NW, NE, SE, and SW. Three pattern voltages which comprise the utilized output voltages of the transducer 94 and a reference ground are obtained from the aforementioned four basic signals. The three pattern voltages are identified in FIG. 7 as NS, EW, and OMNI. The provision of the three pattern voltages and the reference ground from the four basic signals may be shown mathematically in the following manner:

| Signal | Voltage |
| --- | --- |
| NE | $\Sigma_\omega [j\ R/4 + C/4\ (\cos\beta + \sin\beta)] e^{j\omega t}$ |
| SE | $\Sigma_\omega [j\ R/4 + C/4\ (-\cos\beta + \sin\beta)] e^{j\omega t}$ |
| SW | $\Sigma_\omega [j\ R/4 + C/4\ (-\cos\beta - \sin\beta)] e^{j\omega t}$ |
| NW | $\Sigma_\omega [j\ R/4 + C/4\ (\cos\beta - \sin\beta)] e^{j\omega t}$ |
| NS, combined | $(NE+NW)-(SE+SW) = \Sigma_\omega C \cos\beta\ e^{j\omega t}$ |
| EW, combined | $(NE+SE)-(NW+SW) = \Sigma_\omega C \sin\beta\ e^{j\omega t}$ |
| OMNI | $(NE+SE)+(SW+NW) = \Sigma_\omega j\ R\ e^{j\omega t}$ |
| Ground | $(NE+SW)-(NW+SE) = 0$ | where $\beta$ is the bearing angle, R is the response of the radial mode at the circular frequency $\omega$ and C is the response of the circumferential mode at the circular frequency $\omega$.

With particular reference now to FIG. 7, which shows the transducer 94 and combining network comprising four transformers in schematic form and the NS, EW, and OMNI pattern voltage preamplifiers in block form, four summing transformers 49, 50, 51, 52, each with four input windings and one output winding, are utilized to provide the three pattern voltages referred to hereinabove. The transducer is shown with eight electrodes and the voltages at each of the electrodes are arbitrarily identified as N, NE, E, SE, S, SW, W, and NW. The N, S, E, and W voltages are connected to a common high voltage conductor 53 from the power amplifier forming a part of the driver assembly and a tuning coil is connected in series with each of the four remaining transducer electrodes. The polarity of each input winding of the four transformers 49, 50, 51, 52 is indicated in conventional manner by a dot and it should be noted that the polarity of the windings are all the same one with another but that the manner of connecting the signals thereto vary. The secondary winding 54 of transformer 49 is terminated with a resistive load 55 and the secondary winding 56 of transformer 50 comprises the input to the NS preamplifier, the secondary winding 57 of transformer 51 comprises the input to the EW amplifier and the secondary winding 58 of transformer 52 comprises the input to the OMNI preamplifier. The preamplifiers which preferably are transistorized to save space and weight should have a 90 db dynamic range and provide about 45 db of gain. The electrodes of the transducer and the windings of the summing transformers are connected as follows to provide the three pattern voltages (NS, EW, and OMNI) defined hereinbefore. Electrodes 59, 61, 63 and 65 are connected to the conductor 53 which is connected through arms 67 and contacts 68 of the T/R switch in its released or unactivated position as shown in FIG. 7 to the high voltage output of the aforementioned power amplifier in the driver assembly 10. The NE signal from electrode 60 may be traced through tuning coil 69, winding 70 of transformer 49, winding 71 of transformer 50, winding 72 of transformer 51 and winding 73 of transformer 52 to the contacts 92 of the T/R switch, which contacts comprise a common junction for the transducer signals. The SE signal from electrode 62 may be traced through tuning coil 93, winding 74 of transformer 49, winding 75 of transformer 50, winding 76 of transformer 51, and winding 77 of transformer 52 to the aforementioned common junction. The SW signal from electrode 64 may be traced through tuning coil 78, winding 79 of transformer 49, winding 80 of transformer 50, winding 81 of transformer 51, and winding 82 of transformer 52 to the common junction. Finally, the NW signal from electrode 66 may be traced through tuning coil 83, winding 84 of transformer 49, winding 85 of transformer 50, winding 86 of transformer 51, and winding 87 of transformer 52, to the common junction. It is important that the aforementioned signals be supplied to the various windings as shown in FIG. 7 to provide the proper summing function in the transformers. When arms 67 of the T/R switch are in their activated position for listening, the common junction, which is to say contacts 92, are connected to conductor 53. It may now be readily apparent to those skilled in the art that the formation and connection of the transducer electrodes, in the manner described hereinbefore and shown in FIG. 7, to the summing transformer windings having the indicated polarities will provide the three pattern voltages, namely, the NS voltage at the output winding 56 of transformer 50, the EW voltage at output winding 57 of transformer 51 and the OMNI voltage at the output winding 58 of transformer 52. These pattern voltages, which are in relative form, are each initially amplified by the indicated preamplifiers. The output signals of the NS and EW preamplifiers are supplied through separate conductors in the cable 17 to a resolver and the output signal of the OMNI preamplifier is supplied through separate conductors in the cable 17 to a phase shifter. Transformer 49 functions to balance out the effects of the input windings on the remaining three summing transformers and the two sets of four diodes 88, 89 connected respectively between tuning coils 83, 69 and tuning coils 93, 78 function as a switch during transmission. During transmission, the two pairs of oppositely connected diodes 88 provide a short circuit for the NW and NE signals to conductor 90 which is the low voltage line from the power amplifier.

While the present invention has been described in its preferred embodiment and with reference to a particular system, it is realized that modifications may be made and other systems utilized, and it is desired that it be understood that no limitations on the invention are intended other than may be imposed by the scope of the appended claims.

What is claimed is:

1. In a transducer the combination comprising: a cylindrical base; a plurality of annular active elements each encircling a different portion of said base than the others of said elements encircle; means acoustically isolating said elements from said base and from each other; a plurality of substantially parallel and axial electrodes extending substantially the length of said active elements; means for connecting certain of said electrodes one to another to provide a reference ground voltage and a plurality of output voltages; and a combining network including four transformers each having a plurality of input windings and an output winding, said input windings being connected to each other and to said reference ground voltage and said output voltages to provide two dipole pattern voltages and an omnidirectional pattern voltage.

2. In a transducer the combination comprising: a cylindrical base; a plurality of annular active elements each encircling a different portion of said base than the others of said elements encircle; means acoustically isolating said elements from said base and from each other; a plurality of substantially parallel and axial electrodes extending substantially the length of said active elements; means for connecting four quadrature electrodes one to another to provide a reference ground voltage; and a combining network including four transformers each having a plurality of input windings and an output winding, said input windings being coupled to each other and to said quadrature electrodes and the balance of said electrodes to provide two dipole patterns at right angles and an omnidirectional pattern.

3. In a transducer the combination comprising: a cylindrical base; a plurality of annular active elements each encircling a different portion of said base than the others of said elements encircle; means acoustically isolating said elements from said base and from each other; a plurality of substantially parallel and axial electrodes extending substantially the length of said active elements; means for connecting four quadrature electrodes one to another to provide a reference ground voltage; a combining network including four transformers each having a plurality of input windings and an output winding, said input windings being coupled to each other and to said quadrature electrodes and the balance of said electrodes to provide a first dipole pattern voltage at the output winding of one transformer, a second dipole pattern voltage at the output winding of a different transformer, said second dipole pattern voltage being electrically at right angles to said first dipole pattern voltage, and an omnidirectional pattern voltage at the output winding of a different transformer; and means for phase shifting said omnidirectional pattern voltage 90 degrees.

4. A transducer comprising: a support member; at least one substantially annular active element held by said support member; means acoustically isolating each said element from said support member; a plurality of electrodes attached to each said active element; and, means for connecting said electrodes to one another to provide a plurality of output voltages for multimode operation.

5. A transducer comprising: a support member; at least one substantially annular active element held by said support member; means acoustically isolating each said element from said support member; a plurality of electrodes attached to each said active element; means for interconnecting said electrodes; and, means for combining said interconnecting means for said electrodes so as to provide a plurality of output voltages for multimode operation.

6. A transducer comprising: a support member; at least one substantially annular active element held by said support member; means acoustically isolating each said element from said support member; a plurality of electrodes attached to each said active element; means for interconnecting said electrodes; and, means for combining said interconnecting electrodes so as to produce a plurality of dipole pattern voltages and at least one omnidirectional pattern voltage.

References Cited by the Examiner

UNITED STATES PATENTS

| | | | |
|---|---|---|---|
| 2,645,741 | 7/1953 | Westervelt et al. | 340—8 X |
| 2,795,709 | 6/1957 | Camp. | |
| 2,880,404 | 3/1959 | Harris | 340—10 |

CHESTER L. JUSTUS, *Primary Examiner.*

J. P. MORRIS, *Assistant Examiner.*